(12) United States Patent
Jakubowski

(10) Patent No.: US 8,272,173 B2
(45) Date of Patent: Sep. 25, 2012

(54) ANCHORING ASSEMBLY PART FOR A TOWER OF A WIND TURBINE

(75) Inventor: Alexander Jakubowski, Bottrop (DE)

(73) Assignee: Nordex Energy GmbH, Norderstedt (DE)

( * ) Notice: Subject to any disclaimer, the term of this patent is extended or adjusted under 35 U.S.C. 154(b) by 244 days.

(21) Appl. No.: 12/488,706

(22) Filed: Jun. 22, 2009

(65) Prior Publication Data

US 2010/0257811 A1    Oct. 14, 2010

(30) Foreign Application Priority Data

Apr. 8, 2009  (DE) .......................... 10 2009 016 893

(51) Int. Cl.
*E04H 12/00* (2006.01)
(52) U.S. Cl. ......... 52/40; 52/223.1; 52/223.3; 52/223.4; 52/223.5; 52/223.13; 52/838
(58) Field of Classification Search ................ 52/28, 40, 52/223.1, 223.4, 223.5, 223.9, 223.19, 294, 52/295, 296, 297, 707, 838
See application file for complete search history.

(56) References Cited

U.S. PATENT DOCUMENTS

| | | | |
|---|---|---|---|
| 883,474 A * | 3/1908 | Orr | 52/296 |
| 1,299,787 A * | 4/1919 | Schluter | 52/423 |
| 2,420,427 A * | 5/1947 | Henderson | 52/649.3 |
| 2,952,947 A * | 9/1960 | White | 52/708 |
| 4,166,347 A * | 9/1979 | Pohlman et al. | 52/223.4 |
| 5,379,563 A | 1/1995 | Tinsley | |
| 5,826,387 A | 10/1998 | Henderson et al. | |
| 6,591,565 B2 * | 7/2003 | Morello | 52/275 |
| 2006/0201082 A1 * | 9/2006 | Hammer et al. | 52/223.5 |

FOREIGN PATENT DOCUMENTS

| | | |
|---|---|---|
| DE | 2039 263 | 2/1972 |
| DE | 2 304 132 | 8/1974 |
| DE | 102 30 273 B3 | 12/2004 |
| DE | 20 2006 009 554 U1 | 7/2006 |
| DE | 603 11 894 T2 | 11/2007 |
| DE | 10 2007 031 065 A1 | 2/2009 |

* cited by examiner

*Primary Examiner* — William Gilbert
*Assistant Examiner* — Patrick Maestri
(74) *Attorney, Agent, or Firm* — Vidas, Arrett & Steinkraus, P.A.

(57) ABSTRACT

An anchoring assembly part for a wind turbine tower, which part is in a ring- or ring segment shape and prefabricated from a concrete material, and which has at least one projecting reinforcement element for the connection with a lower tower portion made of a concrete material, and at least one bore for receiving an anchor bolt for the detachable connection with an upper tower portion made of steel, an anchor sleeve with an internal thread for screwing in the anchor bolt being arranged in said bore.

14 Claims, 2 Drawing Sheets

ANCHORING ASSEMBLY PART FOR A TOWER OF A WIND TURBINE

CROSS-REFERENCE TO RELATED APPLICATIONS

Figure 1:
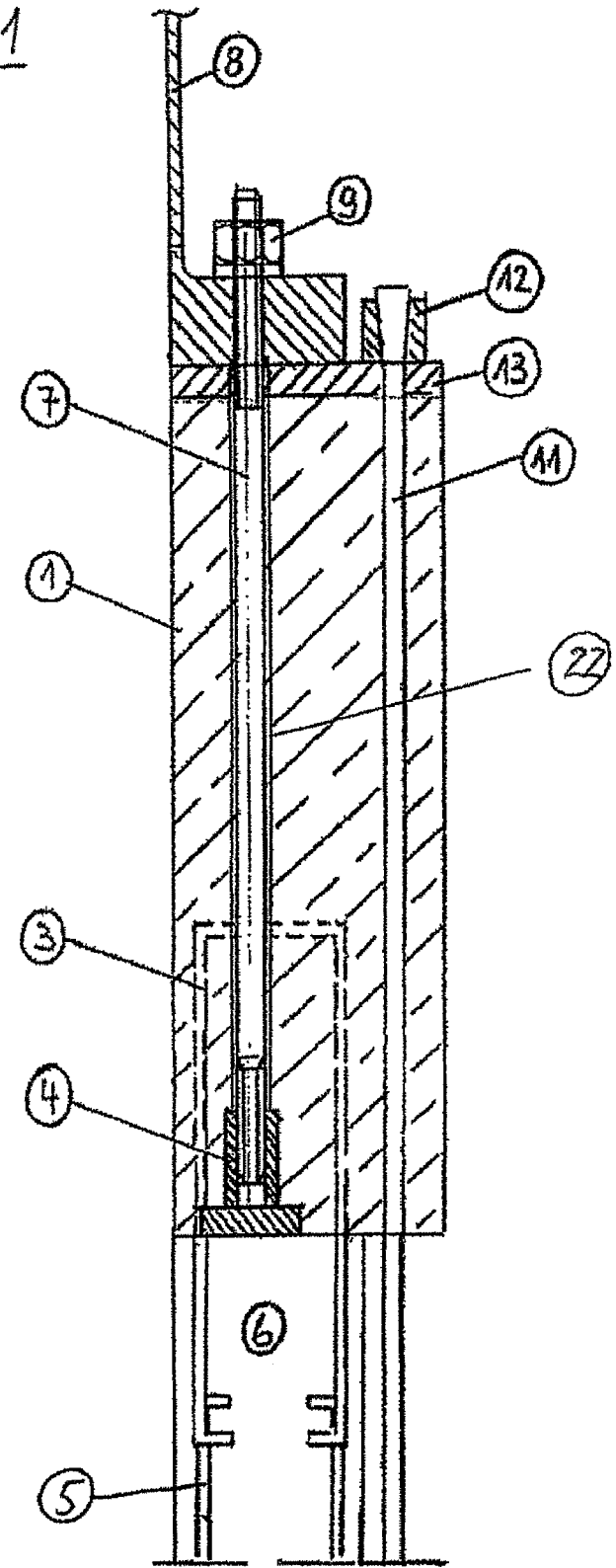

Not applicable.

STATEMENT REGARDING FEDERALLY SPONSORED RESEARCH

Not applicable.

BACKGROUND OF THE INVENTION

The present invention is related to an anchoring assembly part for a wind turbine tower for connection with a lower tower portion, made of a concrete material, and with an upper tower portion made of steel.

Wind turbine towers with tower portions from different materials are also called hybrid towers. The lower concrete-made tower portion is produced of a concrete material. Prefabricated concrete prefabs can be joined together on the construction site, or the concrete tower portion can be produced completely on the construction site by casting (in situ concrete). The steel-made tower portion can consist of plural tubular tower segments, wherein the individual tower segments are produced in one piece or joined together from plural elements that are distributed over the perimeter of the section.

Particular difficulties arise in the connection of the steel-made tower portion with the concrete-made tower portion. Here, different materials meet each other, which must be connected with utmost rigidity and which are subject to high dynamic loads.

For connecting the two tower portions, it is known from DE 603 11 894 T2, the entire contents of which is incorporated herein by reference, to embed an end region of the steel-made tower portion into the tower portion made from concrete. The embedded end region has anchoring elements, which are supposed to improve the support in the tower portion.

From DE 20 2006 009 554 U1, the entire contents of which is incorporated herein by reference, a special steel-made adapter element is known, which is cast together with the concrete-made tower portion. The adapter element is essentially realised in a ring shape and encloses the upper end of the concrete-made tower portion. On the upper side of the adapter element, a tubular tower segment made from steel is fastened by way of a flange connection.

Another annular adapter element is known from DE 102 30 273 B3, the entire contents of which is incorporated herein by reference. The same is also annular and is connected on its upper end with a tubular steel-made tower segment by way of a flange connection. The tower portion arranged below the adapter consists of prestressed concrete, wherein prestressing elements run in the interior of the wall of the lower tower portion and are guided through connection bores of the adapter element. The prestressing elements are anchored above the adapter element, so that they firmly prestress the adapter element with the concrete-made tower portion.

In the solution known from DE 10 2007 031 065 A1, the entire contents of which is incorporated herein by reference, the concrete-made tower portion has a head portion with diagonally arranged through bores. Anchor bolts are guided through these through bores, which can be fixed below the head portion by a nut. The anchor bolts are furthermore guided through bores in a flange of the upper steel-made tower portion, and fastened above this flange also by a nut. This known solution permits to replace the anchor bolts, but is constructionally sumptuous and requires a space-consuming head portion.

From the application document DE 23 041 32, the entire contents of which is incorporated herein by reference, a device for fastening machines on foundations is known. The known fastening device features an anchor sleeve, which is cast into the concrete of the foundation, wherein when casting the concrete, a protective pipe keeps open a bore for an expansion anchor that is to be received.

From the application document DE 20 39 263, the entire contents of which is incorporated herein by reference, an anchor sleeve for concrete prefabs is known, in which two sleeves for fastening a hoisting machine element are cast into the concrete and connected to the hoisting machine.

Starting from this, it is the objective of the present invention to provide an anchoring assembly part for a wind turbine tower for connection with a lower concrete-made tower portion, and with an upper steel-made tower portion, which meets the high rigidity requirements, is designed compactly and simplifies the construction of the tower.

BRIEF SUMMARY OF THE INVENTION

The anchoring assembly part is in a ring- or ring segment shape and prefabricated from a concrete material. It has at least one projecting reinforcement element for the connection with a lower concrete-made tower portion, and at least one bore for receiving an anchor bolt for the detachable connection with an upper steel-made tower portion, in which bore is arranged an anchor sleeve with an internal thread for screwing in the anchor bolt.

The anchoring assembly part is arranged at the upper end of the tower portion made from the concrete material. The annular anchoring assembly part can have a circular or a polygonal cross section. Correspondingly, a ring segment shaped anchoring assembly part can form a segment of such a cross section. The anchoring assembly part is firmly connected to the lower tower portion by way of the projecting reinforcement element. For this purpose, the reinforcement element is preferably joined to a reinforcement of the lower tower portion.

The anchor bolts produce the connection to the upper steel-made tower portion, which is preferably arranged above the anchoring assembly part. These can be screwed into the anchor sleeve, which is fixed in the anchoring assembly part. For this reason, they can be inserted also after the completion of the lower concrete-made tower portion, and be replaced any time. For instance, the anchor sleeve can be cast into the anchoring assembly part when the same is produced, and firmly anchored therein by doing so. In contrast to the solution known from the state of the art, it is not necessary to guide the anchor bolt through the head portion and the anchoring assembly part, respectively, such that the lower end is accessible for fixing it with the aid of a nut. This permits to arrange the anchor bolts parallel to an outer and/or inner face of the tower portion made of the concrete material. Therefore, the anchoring assembly part can be realised particularly compactly. In particular, its dimensions can be adapted to the cross section of the tower portion made of the concrete material, such that a flush transition is achieved on the outer and/or inner side of the tower.

Further advantages are provided by the prefabrication of the tower portion from a concrete material. In particular, the alignment of the anchoring system on the construction site is simplified. In contrast to a special head portion, which is cast on the construction site, the accurate alignment of the bores for the anchor bolts relative to each other can be made sure already before the construction of the tower. At the construction site, only the entire anchoring assembly part has to be brought into the correct position. This is possible in a simple way, by corresponding joining of the reinforcement elements to the reinforcement of the lower tower portion. A further advantage is that a concrete material with particularly high resistance to pressure can be selected in the production of the anchoring assembly part, independently from the selection of the concrete material for the lower tower portion. Through this, the connection to the steel-made tower portion is simplified, wherein a load distribution plate can be omitted according to circumstances.

In one embodiment, the anchoring assembly part is ring segment shaped and adapted to be connected to at least one, or by way of example, two, three or more further ring segment shaped anchoring assembly part(s), in particular shaped identically, so as to form a closed ring. The segments connected to each other form in common an annular anchoring assembly part. Preferably, the connection of the ring segment shaped anchoring assembly parts can take place by way of a groove and tongue connection.

In one embodiment, the at least one reinforcement element projects towards the downside from the anchoring assembly part. In principle, it may also project laterally from the anchoring assembly part, and be anchored in the concrete-made tower portion in this region. However, a joining of the reinforcement below the anchoring assembly part permits a particularly compact construction.

In one embodiment, each reinforcement element consists of a pair of steel rods. The ends of the steel rods projecting out of the anchoring assembly part can be at an angle, in order to simplify the joining to the reinforcement of the concrete tower portion and to achieve a firmer anchoring. For the connection with the reinforcement of the concrete tower portion, the reinforcement elements may have also other shapes, like for instance straight rods, hooks, hoops or comparable shapes.

According to one embodiment, the at least one reinforcement element is a U-shaped steel hoop, whose free ends project from the anchoring assembly part. In this case, the central section of the U-shaped steel hoop is cast into the anchoring assembly part and particularly firmly fixed therein. The free ends of the U-shaped steel hoop can feature the already explained different shapes in particular, in order to simplify the joining to the reinforcement of the concrete tower portion.

According to one embodiment, the anchoring assembly part has a plurality of reinforcement elements, uniformly distributed in the perimeter direction. Through this, a uniform introduction of forces into the concrete tower portion is achieved.

In one embodiment, the bores for accommodating the anchor bolts run in the axial direction of the anchoring assembly part. This indication of a direction is always related to an annular anchoring assembly part, like the direction indications below. Correspondingly, in a ring segment shaped anchoring assembly part, the direction indication is related to a virtually completed ring. In a cylindrical ring, the anchor bolts can be arranged accurately in the axial direction. In a ring formed slightly conical, corresponding to the concrete-made tower portion, it may also be deviated from the axial direction, corresponding to the inclination angle of the cone. In both cases, the alignment of the anchor bolts permits a particularly firm anchoring, with compact construction of the anchoring assembly part at the same time.

For the sake of uniform load distribution and force introduction, the bores are preferably arranged over the anchoring assembly part uniformly distributed in the perimeter direction.

In a further embodiment, the bores are arranged on two radially spaced circles or circle segments, respectively. This arrangement permits a particularly firm connection, in particular to a flange realised with a corresponding width on the steel-made tower portion. The flange can be realised in a T-shape with one series of bores on each side of the tower wall.

According to one embodiment, a sheath made of plastics is arranged in the at least one bore for receiving the anchor bolt, which receives the anchor bolt and which extends through the bore, starting from the anchor sleeve. In the casting of the anchoring assembly part, the sheath makes sure that the bore is arranged as desired and that the internal thread of the anchor sleeve remains clear. Besides, it prevents direct contact of the anchor bolt with the concrete.

In one embodiment, the anchoring assembly part has at least one additional bore for receiving a prestressing element for the lower tower portion made of a concrete material. With the aid of the prestressing element, the concrete-made tower portion can be prestressed when indicated already before the connection with the steel-made tower portion. In this way, the completion of the concrete tower portion is uncoupled from the availability and the installation of the steel-made tower portion.

According to one embodiment, a steel-made load distribution plate exists, which is arranged above the anchoring assembly part and is provided with bores that correspond to the bores in the anchoring assembly part. The load distribution plate can be arranged on the anchoring assembly part at the construction site, or already in the prefabrication of the same. It provides for a uniform pressure load of the anchoring assembly part.

According to one embodiment, the at least one anchor sleeve is arranged on a lower face of the anchoring assembly part. A maximum extraction resistance results from this arrangement.

In one embodiment, the at least one anchor sleeve has an internally threaded sleeve and a disc, connected to the internally threaded sleeve. The disc may be fixedly connected to the internally threaded sleeve, by welding for instance, or be made in one piece with it. It is also possible to turn on the disc on the internally threaded sleeve.

BRIEF DESCRIPTION OF THE SEVERAL VIEWS OF THE INVENTION

Figure 2:
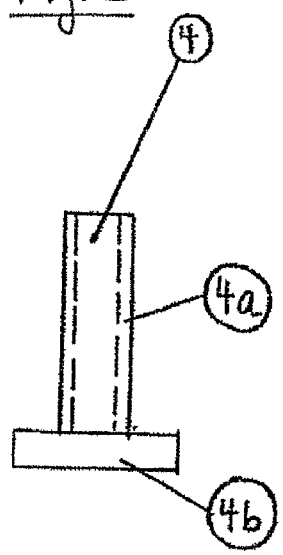

The present invention will be explained in more detail by means of an example of its realisation depicted in two figures. They show:

FIG. 1 a cross section through an anchoring assembly part of the present invention, connected to a concrete-made tower portion or a steel-made tower portion;

FIG. 2 the anchor sleeve of FIG. 1 in an enlarged view.

Figure 3:
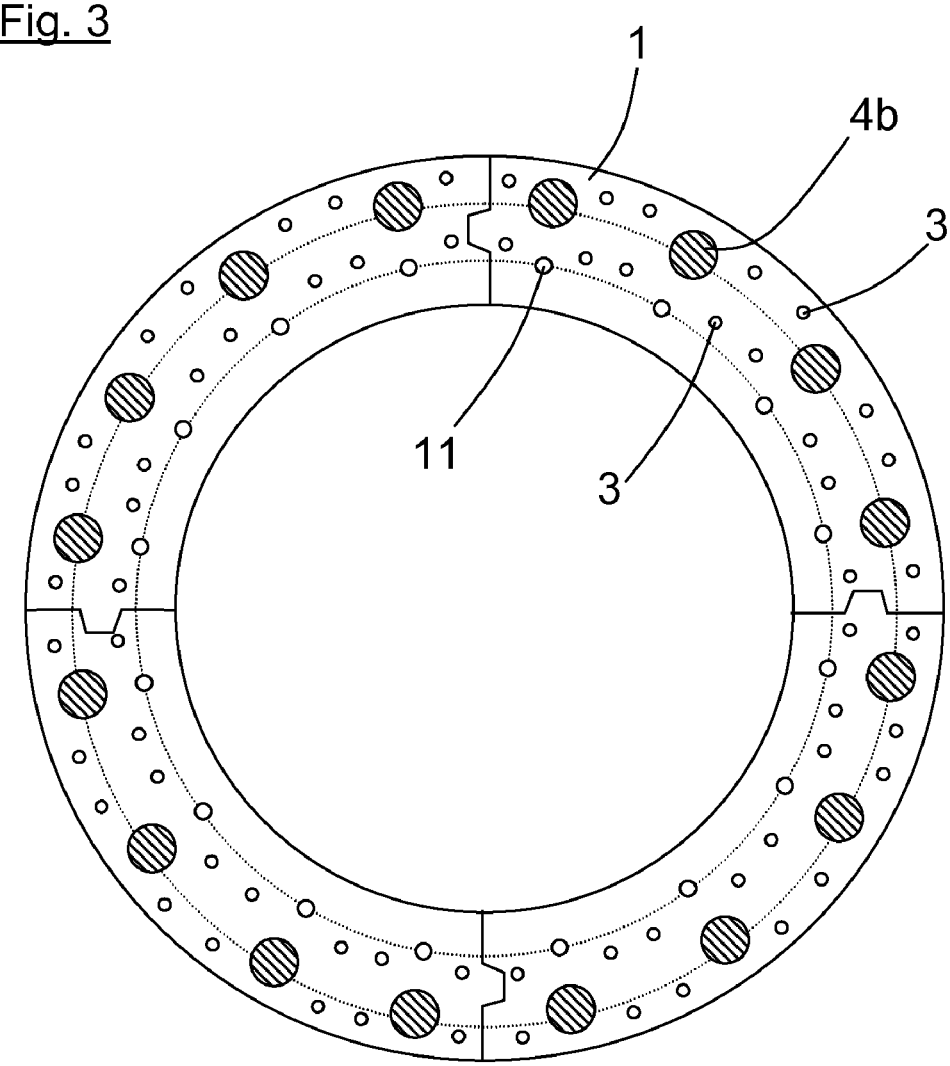

FIG. 3 shows the anchoring assembly part 1 of FIG. 1 in an additional view in cross section.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The anchoring assembly part 1 of FIG. 1 is prefabricated from a concrete material. It is a ring segment in the shape of a cylinder shell. A half or quarter shell can also be used.

The anchoring assembly part 1 has a plurality of bores for accommodating an anchor bolt 7, distributed uniformly over the perimeter and aligned in the axial direction. The bores extend over the entire height of the anchoring assembly part 1. An anchor sleeve 4 is arranged on the lower end of the anchoring assembly part. A disc, whose lower end is flush with the lower face of the concrete ring, forms the lower end of the anchor sleeve. Besides, the anchor sleeve 4 has an internally threaded sleeve, into which the anchor bolt 7 is screwed in. The anchor sleeve 4 is fixedly cast into the concrete ring. From the upper end of the internally threaded sleeve of the anchor sleeve 4 extends a sheath 22 made of plastics, which extends up to the upper end of the concrete ring and keeps the bore as well as the internally threaded sleeve clear when casting the concrete material.

The anchoring assembly part 1 has a plurality of U-shaped reinforcement elements 3, whose free ends are at an angle and project towards the downside from the anchoring assembly part 1. The free ends of the reinforcement elements 3 are connected to a reinforcement 5 of the tower portion 6 made of a concrete material, which is arranged below the anchoring assembly part 1. The lower tower portion 6 consists of in situ concrete and is fixedly cast together with the anchoring assembly part 1 in its construction.

The anchoring assembly part 1 has further bores distributed uniformly over its perimeter, which are arranged radially inside the bores for the anchor bolt 7, also run in the axial direction and serve for receiving prestressing elements 11. The tower portion 6 made of concrete, including the anchoring assembly part 1, is prestressed with the prestressing elements 11.

Above the anchoring assembly part 1 is arranged a steel-made load distribution plate 13, which is provided with a plurality of bores, whose arrangement corresponds to that of the bores in the anchoring assembly part 1, so that the anchor bolts 7 and the prestressing elements 11 can be guided through the load distribution plate 13. Above the load distribution plate 13, the prestressing elements 11 are anchored in a prestressing element anchor head 12.

The steel-made tower portion 8, arranged above the anchoring assembly part 1 and the load distribution plate 13, has an L-shaped flange, radially pointing towards the inside. The same is provided with bores corresponding to the bores in the anchoring assembly part 1, through which the anchor bolts 7 are guided. Above the flange, the anchor bolts 7 are fastened with a washer and a nut 9, so that they prestress the flange of the steel-made tower portion 8 with the anchoring assembly part 1.

In FIG. 2, one recognises the construction of the anchor sleeve 4 from an internally threaded sleeve 4a and a disc 4b that is connected to the internally threaded sleeve 4a.

FIG. 3 shows the anchoring assembly of FIG. 1 in an additional view in cross section, taken through the disc 4b (best seen in FIG. 2). The cross sectional plane runs through the bottom end of the assembly part 1, right through the disc 4b of the anchor sleeve 4. FIG. 3 shows that disc 4b is ring shaped or ring segment shaped, and shows tongue and groove connections between the ring segments. The reinforcement elements 3 and bores being distributed around the perimeter direction of the ring, and the bores being arranged in two spaced circles.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind turbine tower comprising:
   an anchoring assembly part prefabricated from a concrete material;
   a lower tower portion made of a concrete material;
   an upper tower portion made of steel, the anchoring assembly part connecting the upper tower portion to the lower tower portion;
   said anchoring assembly part being of ring shape or ring-segment shape and comprising a projecting reinforcement element, a bore, an anchoring bolt, an anchoring sleeve having an internal thread, an additional bore and a prestressing element;
   the projecting reinforcement element being connected to the lower tower portion;
   the anchor bolt being arranged in said bore, screwed with one end into the internal thread of the anchor sleeve and detachably connected with its other end to the upper tower portion;
   further wherein the prestressing element is received in the additional bore, prestressing the lower tower portion.

2. The wind turbine tower according to claim 1, characterised in that it is ring segment shaped and adapted to be connected to at least one further ring segment shaped anchoring assembly part so as to form a closed ring.

3. The wind turbine tower according to claim 2, characterised in that it has a groove and a tongue for connection with a further ring segment shaped anchoring assembly part so as to form a closed ring.

4. The wind turbine tower according to claim 1, characterised in that the at least one reinforcement element projects towards the downside from the anchoring assembly part.

5. The wind turbine tower according to claim 1, characterised in that the at least one reinforcement element consists of a pair of steel rods.

6. The wind turbine tower according to claim 1, characterised in that the at least one reinforcement element is an U-shaped steel hoop, whose free ends project from the anchoring assembly part.

7. The wind turbine tower according to claim 1, characterised in that it has a plurality of reinforcement elements, uniformly distributed in the perimeter direction.

8. The wind turbine tower according to claim 1, characterised in that the bores for receiving the anchor bolts run in the axial direction of the anchoring assembly part.

9. The wind turbine tower according to claim 1, characterised in that the bores are arranged over the anchoring assembly part uniformly distributed in the perimeter direction.

10. The wind turbine tower according to claim 1, characterised in that the bores are arranged on two radially spaced circles or circle segments, respectively.

11. The wind turbine tower according to claim 1, characterised in that a sheath made of plastics is arranged in the at least one bore for receiving the anchor bolt, which receives the anchor bolt and which extends through the bore, starting from the anchor sleeve.

12. The wind turbine tower according to claim 1, characterised in that a load distribution plate made of steel exists, which is arranged above the anchoring assembly part and is provided with bores that correspond to the bores in the anchoring assembly part.

13. The wind turbine tower according to claim 1, characterised in that the at least one anchor sleeve is arranged on a lower face of the anchoring assembly part.

14. The wind turbine tower according to claim 1, characterised in that the at least one anchor sleeve has an internally threaded sleeve and a disc, connected to the internally threaded sleeve.

* * * * *